3,822,310
SUBSTITUTED INDENYL ACETIC ACIDS

Tsung-Ying Shen, Westfield, Howard Jones, Holmdel, and Michael W. Fordice, Cranford, N.J., assignors to Merck & Co., Inc., Rahway, N.J.
No Drawing. Filed Jan. 21, 1971, Ser. No. 108,630
Int. Cl. C07c 147/14
U.S. Cl. 260—515 A    5 Claims

ABSTRACT OF THE DISCLOSURE

New substituted indene acids and non-toxic pharmaceutically acceptable amides, esters and salts derived therefrom. The substituted indene acids disclosed herein have anti-inflammatory, anti-pyretic and analgesic activity. Also included herein are methods of preparing said indene acid compounds, pharmaceutical compositions having said indene acid compounds as an active ingredient and methods of treating inflammation by administering these particular compositions to patients.

---

This invention relates to new substituted indenyl acetic acid compounds and processes for producing the same. More specifically, this invention relates to compounds having the following general formula:

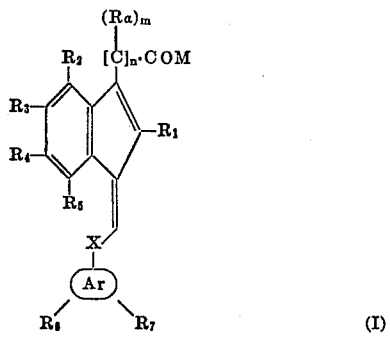

wherein $R_a$ is hydrogen, halogen, alkyl, alkenyl, alkoxy or amino;
$m$ is 1–2;
$n$ is 1–3;
X is alkylene, alkenylene, alkynylene, O, S, carbonyl, or NR where R can be hydrogen or alkyl (and any combination of two of these);
$R_1$ is hydrogen, alkyl, haloalkyl, alkenyl, or alkynyl;
$R_2$, $R_3$, $R_4$ and $R_5$ each can be hydrogen, alkyl, acyloxy, alkoxy, nitro, amino, acylamino, alkylamino, dialkylamino, alkenyl, dialkylaminoalkyl, sulfamyl, alkylthio, mercapto, alkynyl, hydroxy, hydroxyalkyl, alkylsulfonyl, halogen, cyano, carboxyl, carboalkoxy, carbamido, halogenoalkyl, cycloalkyl, cycloalkoxy, alkenyloxy, or acyl;
Ar is aryl or heteroaryl;
$R_6$ is alkylsulfinyl or alkylsulfonyl;
$R_7$ is hydrogen, halogen, hydroxy, alkoxy or haloalkyl; and
M is hydroxy, loweralkoxy, substituted loweralkoxy, amino, alkylamino, dialkylamino, N-morpholino, hydroxyalkylamino, polyhydroxyalkylamino, dialkylaminoalkylamino, aminoalkylamino or OMe in which Me is a cation;

provided, however, that when X is alkylene or alkenylene, $R_6$ may not be hydrogen.

The indene nucleus may be substituted in the 1-position by an aryl ring system such as benzene, naphthalene or biphenyl or a heteroaryl ring system such as a pyrrole, furan, thiophene, pyridine, imidazole, pyrazine, thiazole, etc., which contains an alkylsulfinyl or alkylsulfonyl substituent and may be further substituted with a halogen (chloro, fluoro, or bromo), hydroxy, alkoxy (methoxy, ethoxy, propoxy, etc.) or haloalkyl (fluoromethyl, chloroethyl, trifluoromethyl, etc.) group.

Representative compounds of this invention are as follows:

5-α-Difluoro-2-methyl-1-(3'-chloro-4'-methylsulfinylphenylethylidene)-3-indenyl-acetic acid
5-Fluoro-2-methyl-1-(3'-chloro-4'-methylsulfinylphenylethylidene)-3-indenylacetic acid
5-Chloro-2-methyl-1-(3'-chloro-4'-methylsulfinylphenylethylidene)-3-indenylacetic acid
5-Fluoro-2-methyl-1-(3'-chloro-4'-methylsulfinylphenylethylidene)-3-indenyl-(α-propionic) acid
5-Fluoro-2-methyl-1-(3'-chloro-4'-methylsulfinylphenylpropargylidene)-3-indenyl-(α-propionic) acid
5-α-Difluoro-2-methyl-1-(3'-chloro-4'-methylsulfinylphenylpropargylidene)-3-indenylacetic acid
5-Fluoro-2-methyl-1-(3'-chloro-4'-methylsulfinylphenylpropargylidene)-3-indenylacetic acid
5-Allyloxy-2-methyl-1-(3'-chloro-4'-methylsulfinylphenylpropargylidene)-3-indenylacetic acid
5-Fluoro-2-methyl-1-(4'-methylsulfinylphenoxymethylidene)-3-indenyl-(α-propionic) acid and the corresponding amides, esters and pharmaceutically acceptable salts.

It should be noted that the compounds of this invention may be isomerized into their cis and trans isomers by procedures well known in the art. It should be further noted that the cis isomer of the compounds of this invention is substantially more active than the trans isomer. Accordingly, it is to be understood that reference throughout the specification and appended claims to the compounds of this invention is intended to encompass not merely the compounds per se but includes their geometric isomers (cis, trans).

It should be further noted by one skilled in the art that the alkylsulfinyl derivative of this invention are racemic mixtures of optically active enantiomorphs which may be resolved into their (+) and (−) forms by techniques well known in the art. Furthermore, when $m$ is 1 or the $R_a$ substituents are different and $n$ is 1, an additional asymmetric atom results which gives rise to two additional enantiomorphs, which are also considered to be within the scope of the invention.

One skilled in the art should further note that some of the compounds of this invention are polymorphic and have different crystalline structures, melting points and solubility characteristics.

This invention also relates to a method of treating pain, fever or inflammation in patients using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have anti-pyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterally adminitsering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-O-Sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin, capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such mtaerials are cocoa butter and polyethylene glycol. Gels and lotions for topical application may be prepared in conventional manners.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human) a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg. per day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of excretion, drug combination, reaction sensitivities and severity of the particular disease.

In the preparation of the compounds of this invention, the starting material is a β-aryl propionic acid. This compound is prepared according to the procedure shown in Flow Sheet I which illustrates several alternative routes. Thus, a substituted benzaldehyde may be condensed with a substituted acetic ester in a Claisen Reaction or with an α-halogenated propionic ester in a Reformatsky Reaction. The resulting unsaturated ester is reduced and hydrolyzed to give the benzyl propionic acid starting material. Alternatively, a substituted malonic ester in a typical malonic ester synthesis and acid hydrolysis of the resulting substituted ester yields the benzyl propionic acid directly or the benzaldehyde may be reacted with propionic anhydride in a reducing medium to form the benzyl propionic acid.

(I) Preparation of β-arylpropionic acid starting material

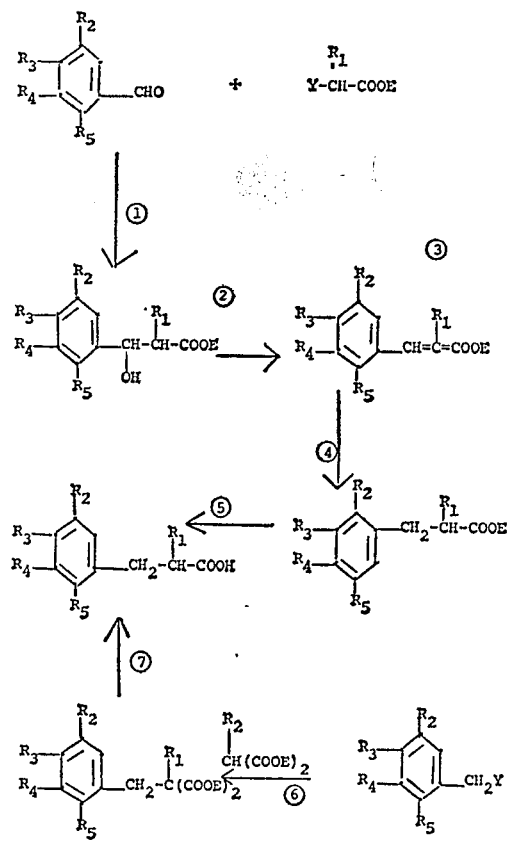

Equivalents

Y is halogen, usually Cl or Br;
E is an esterifying group, usually methyl, ethyl or benzyl;
$R_1$ is hydrogen or alkyl;
$R_2$, $R_3$, $R_4$, and $R_5$ each may be hydrogen, alkyl, acyloxy, alkoxy, nitro, amino, acylamino, alkylamino, dialkylamino, dialkylaminoalkyl, sulfamyl, alkylthio, mercapto, hydroxy, hydroxyalkyl, alkylsulfonyl, halogen, cyano, carboxyl, carboalkoxy, carbamido, halogenoalkyl, cycloalkyl, cycloalkoxy, alkenyloxy, alkenyl, alkynyl, or acyl;

Reagents (1) Zn dust in anhydrous inert solvent, such as benzene and ether.
(2) $KHSO_4$ or p-toluene sulfonic acid.
(3) $NaOC_2H_5$ in anhydrous ethanol at room temperature.
(4) $H_2$, palladium on charcoal, 40 p.s.i., room temperature.
(5) NaOH in aqueous alcohol at 20–100°.
(6) $NaOC_2H_5$ or any other strong base, such as NaOH or K-t-butoxide.
(7) Acid.

In the preparation of the compounds of the instant invention, again a number of routes are possible, as shown in Flow Sheet II. The first step is ring closure of the β-aryl propionic acid to form an indanone which may be carried out by a Friedel-Crafts Reaction using a Lewis acid catalyst or by heating with polyphosphoric acid. The indanone may be condensed with an α-halo ester in the Reformatsky Reaction to introduce the aliphatic acid side chain by replacing the carbonyl group. Alternatively, this introduction can be carried out by the use of a Wittig Reaction in which the reagent is an α-triphenylphosphinyl ester, a reagent which replaces the carbonyl with a double bond to a carbon. This is immediately rearranged into the indene. If the Reformatsky Reaction route is used, the intermediate 3-hydroxy-3-aliphatic acid derivative must be dehydrated to the indene. The introduction of the 1-substituent is carried out in one of two ways. The first is the direct reaction of the indene with the aldehyde of the structural characteristics defined, using a strong base as a catalyst and warming, if necessary, to form the carbanion. The reaction can be carried out in a number of solvents such as polar solvents like dimethoxy-ethane, aqueous methanol, pyridine, liquid ammonia, dimethyl-formamide and the like, or in non-polar solvents such as benzene, etc. Alternatively, an indanone can be brominated and then dehydrogen-brominated to an indenone and the indenone carbonyl replaced by the substituent using the α-triphenyl-phosphinyl compounds of the desired structure. Note that E in the third stage and in the fifth stage is a loweralkoxy group and thus forms a loweralkyl ester of the desired compound. This ester can then be hydrolyzed to give the free acids and oxidized to give the sulfoxides and sulfones from which the salts, other esters and the amides may be formed. Step 6 can also be carried out when E is hydrogen.

Equivalents

Y, E, $R_1$, $R_2$, $R_3$, $R_4$, $R_5$ and $R_7$ are the same as in Flow Sheet I;
X is alkylene, alkenylene, alkynylene, O, S, carbonyl, or NR where R can be hydrogen or alkyl;
(Ar) is aryl or heteroaryl; and
$R_8$ is hydrogen or loweralkyl.

Reagents (1) Friedel-Crafts Reaction using a Lewis Acid catalyst.
(2) Heat with polyphosphoric acid.
(3) Reformatsky Reaction: Zn in inert solvent, heat.
(4) p-Toluene sulfonic acid and $CaCl_2$ or $I_2$ at 200°.
(5) Wittig Reaction using $(C_6H_5)_3P=CHCOOE$ at 20–120° in ether, benzene, toluene, xylene, etc.
(6) Reaction with aldehyde or ketone, using strong base as catalyst (K-t-butoxide or any alkoxide, NaOH, KOH, $NaNT_2$, etc.), warming if necessary to form the carbanion in solvents such as liquid ammonia, dimethylformamide, 1,2-dimethoxyethane, pyridine, aqueous alcohol, etc.

(II) Preparation of α-(1-substituted methylenyl-3-indenyl)-aliphatic acids

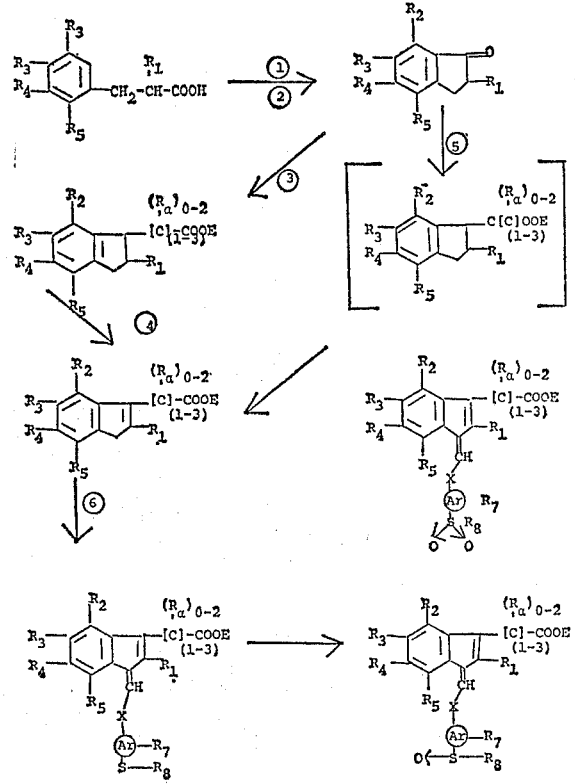

Although the syntheses described produce esters of the acids of this invention, some desired esters are more easily obtained by forming a simple ester of the final acid, hydrolyzing to the free acid and re-esterifying. The simple loweralkyl or benzyl esters are usually the ones used in the synthesis of the compounds. Other esters are more desirable from the standpoint of therapeutic utility of the compounds, such as the methoxymethyl, diethylaminoethyl, dimethylaminoethyl, dimethylaminopropyl, diethylaminopropyl, N-pyrollidinylethyl, N-piperidinylethyl, N-morpholinylethyl, N-ethyl-2-piperidinylethyl, N-pyrollidinylmethyl, N-methyl-2-pyrollidinylmethyl, 4-methyl-1-piperazinylethyl, methoxyethyl, ethoxyethyl and the like. These are mostly prepared from the corresponding alcohol and the indenyl acid.

The amides, both the simple amide and the substituted amides, are similarly prepared from the indenyl acids and the corresponding amines. Especially useful therapeutically are the morpholide, the bis(hydroxyethyl)amide and the like.

Similarly, salts are obtained by neutralizing the indenyl acids with bases or by methathesis of other salts. Especially useful are the metallic salts such as the alkali metal or alkaline earth salts and the amine and quaternary ammonium salts, which are water soluble, but the heavy metal salts such as iron, aluminum, etc. are also useful for some purposes.

The following examples are presented to further illustrate the invention:

EXAMPLE 1

(A) 3-Chloro-4-methylthiobenzaldehyde o-Chlorothioanisole (0.35 mole) in methylene chloride (200 ml.) is added to anhydrous aluminum chloride (66.67 g., 0.5 mole). The mixture is stirred and cooled while dichloromethyl methyl ether is added dropwise. After the solution is completed, the mixture is stirred for 15 minutes at room temperature. The liquid phase is decanted into ice and water (300 g.) and the unreacted aluminum chloride is washed with methylene chloride until the washes are combined. The layers are separated and the ortanic layer is washed with saturated potassium carbonate, dried ($MgSO_4$), and distilled to yield 3-chloro-4-methylthiobenzaldehyde.

(B) 3-Chloro-4-methylthiophenylacetaldehyde

To a mixture of 3-chloro-4-methylthiobenzaldehyde (1.0 mole), ethyl chloroacetate (123 g., 1.0 mole) in benzene (200 ml.) is added over 2 hours finely powdered sodium amide (47.2 g., 1.2 mole). The temperature is maintained at 15–20° by external cooling. The mixture is stirred for 2 hours addition at 25° and poured onto cracked ice (700 g.) with agitation. The benzene layer is separated and the aqueous extracts washed with benzene (200 ml.). The combined benzene solutions are washed with water and dilute acetic acid (3 × 300 ml.), the last with glacial acetic acid (10 ml.). The benzene solution is dried ($Na_2SO_4$), concentrated in vacuo and distilled to yield ethyl α,β-epoxy-3-chloro-4-methylthiocinnamate.

To an ethanolic solution of sodium ethoxide (15.5 g., 0.67 gram-atom of sodium in ethanol [300 ml.]) is added the above ester (0.64 mole) slowly with shaking. The contents of the flask are cooled to 15° and water added (15 ml.). The mixture is allowed to stand overnight at 25°. The mixture is filtered, the precipitate washed with ethanol (50 ml.) and ether (50 ml.) and the residue dried in air. The residue is added to dilute hydrochloric acid (2.2 N, 350 ml.). The mixture is warmed to envolve carbon dioxide, then warmed on a steam bath for 1.5 hours. The mixture is cooled, extracted with benzene, the benzene extract washed with water, dried ($Na_2SO_4$), concentrated in vacuo and distilled to yield 3-chloro-4-methylthiophenylacetaldehyde.

(C) Ethyl 5,α-difluoro-2-methyl-3-indenylacetate

A mixture of 6-fluoro-2-methyl-1-indanone (24.6 g., 0.15 mole), "activated" zinc dust (12.7 g., 0.20 mole), ethyl bromofluoroacetate (27.8 g., 0.15 mole), and a crystal of iodine in dry benzene (750 ml.) is refluxed for 5 hours. The mixture is poured into 4% sulfuric acid (750 ml.), extracted with ether, the ether extract dried (MgSO₄), and the ethereal solution concentrated. The crude ester is redissolved in benzene (220 ml.) and phosphorous pentoxide (44 g.) added, and the resulting mixture is refluxed for 30 minutes. The mixture is decanted, the residue washed with benzene, the benzene layers are combined, washed with water, saturated salt solution and dried (MgSO₄). Concentration of the dried organic phase yields ethyl 5,α-difluoro-2-methyl-3-indenylacetate as a residue.

(D) Cis- and trans-5,α-difluoro-2-methyl-1-(3'-chloro-4'-methylthiophenylethylidene)-3-indenylacetic acids Powdered sodium methoxide (22 g., 0.40 ml.) is added to a suspension of ethyl 5,α-difluoro-2-methyl-3-indenylacetate (50.4 g., 0.2 mole) and 3-chloro-4-methylthiophenylacetaldehyde (0.2 mole) in methanol (400 ml.) under dry nitrogen. A clear solution results and this mixture is refluxed for 1 hour. An equal volume of water is added and refluxing continued for 30 minutes more to complete saponification. The solution is cooled to room temperature, diluted with several volumes of water and nitrogen is bubbled through to remove any remaining ether. Addition of 50% aqueous acetic acid precipitates the product. The precipitate is separated by filtration, washed well with water and dried in a desiccator over potassium hydroxide pellets, then at 100° in a vacuum oven. The crude product is taken up in methylene chloride and chromatographed over Silica Gel H to separate cis- and trans-isomers, identifiable by integrating the 2-methyl-signal in the N.M.R. spectrum at 7.82 p.p.m. for cis and 8.20 p.p.m. for trans.

(E) Cis-5-α-difluoro-2-methyl-1-(3'-chloro-4'-methyl-sulfinylphenylethylidene)-3-indenylacetic acid Sodium metaperiodate trihydrate (11.3 g., 0.0422 mole) in water (85 ml.) is added to cis-5,α-difluoro-2-methyl-1-(3'-chloro - 4' - methylthiophenylethylidene)-3-indenylacetic acid (3.72 g., 0.01 mole) in methanol (240 ml.) and acetone (10 ml.) at room temperature. The mixture is stirred overnight, concentrated to small volume, diluted with water, dried in air, then in vacuo at 50° and recrystallized from ethyl acetate-n-hexane to yield cis-5,α-difluoro - 2 - methyl-1-(3'-chloro-4'-methylsulfinylphenylethylidene)-3-indenylacetic acid.

Using the same reaction conditions and techniques, the following cis-5,α-difluoro compounds are prepared by the procedure of Example 1:

| Starting material | Product |
|---|---|
| 5,6-difluoro-2-methyl-1-indanone. | Cis-5,6,α-trifluoro-2-methyl-1-(3'-chloro-4'-methylsulfinylphenylethylidene)-3-indenylacetic acid. |
| 5-methoxy-6-fluoro-2-methyl-1-indanone. | Cis-6, α-difluoro-5-methoxy-2-methyl-1-(3' - chloro - 4' - methylsulfinylphenylethylidene) - 3 - indenylacetic acid. |
| 6-cyano-2-methyl-1-indanone. | Cis - 5 - cyano - α - fluoro - 2 - methyl-1-(3'-chloro-4' - methylsulfinylphenylethylidene)-3-indenylacetic acid. |
| 6 - dimethylamino - 2 - methyl-1-indanone. | Cis - 5 - dimethylamino - α - fluoro-2-methyl - 1 - (3' - chloro - 4' - methylsulfinylphenylethylidene) - 3 - indenylacetic acid. |
| 6 - allyloxy - 2 - methyl - 1 - indanone. | Cis - 5 - allyloxy - α - fluoro - 2 - methyl-1 - (3' - chloro - 4' - methylsulfinylphenylethylidene) - 3 - indenylacetic acid. |
| 5-fluoro-2-methyl-1-indanone. | Cis-6,α-difluoro-2-methyl-1-(3'-chloro-4' methylsulfinylphenylethylidene)-3-idenylacetic acid. |

EXAMPLE 2

Trans-5,α-difluoro-2-methyl-1-(3'-chloro-4'-methylsulfinylphenylethylidene)-3-indenylacetic acid When the trans-isomer (0.744 g., 0.002 mole) of Example 1(D) is treated by the process of Example 1(E), the subject compound is obtained.

EXAMPLE 3

Cis- and trans-5-fluoro-2-methyl-1-(3'-chloro-4'-methylsulfinylphenylethylidene)-3-indenylacetic acids Methyl 5-fluoro-2-methyl-3-indenylacetate (44.05 g., 0.2 mole) and 3-chloro-4-methylthiophenylacetaldehyde (0.2 mole) are condensed by the method of Example 1(D) and further treated by the method of Examples 1(B) and 2 to yield the subject compounds.

| Starting material | Product |
|---|---|
| Methyl 5,6-difluoro-2-methyl-3-indenylacetate. | Cis- and trans-5,6-difluoro-2-methyl-1-(3' - chloro - 4'-methylsulfinylphenylethylidene)-3-indenylacetic acids. |
| Methyl 5-cyano-2-methyl-3-indenylacetate. | Cis- and trans-5-cyano-2-methyl-1-(3'-chloro-4'-methylsulfinylphenylethylidene)-3-indenylacetic acids. |
| Methyl 5-methoxy-6-fluoro-2-methyl-3-indenyl acetate. | Cis- and trans-5-methoxy-6-fluoro-2-methyl-3' - chloro-4' - methylsulfinylphenylethylidene) - 3 - indenylacetic acids. |
| Methyl 5-dimethylamino-2-methyl - 3 - indenylacetate. | Cis- and trans-5-dimethylamino-2-methyl - 1 - (3' - chloro - 4' - methylsulfinylphenylethylidene) - indenylacetic acids. |
| Methyl 5-allyloxy-2-methyl-3-indenylacetate. | Cis- and trans-5-allyloxy-2-methyl-1-(3' - chloro - 4' - methylsulfinylphenylethylidene) - 3 - indenylacetic acids. |
| Methyl 6-fluoro-2-methyl-3-indenylacetate. | Cis- and trans-6-fluoro-2-methyl-1-(3' - chloro - 4' - methylsulfinylphenylethylidene) - 3 - indenylacetic acids. |

EXAMPLE 4

(A) Ethyl 5-fluoro-2-methyl-3-indenyl-α-propionate

A mixture of 6-fluoro-2-methyl-1-indanone (49.2 g., 0.30 mole), "activated" zinc dust (25.4 g., 0.40 mole), ethyl α-bromopropionate (54.3 g., 0.3 mole) and a crystal of iodine in dry benzene (1.5 liters) is refluxed for 5 hours. The mixture is poured into 5% sulfuric acid (1.5 l.), extracted with ether, the ether extract dried (MgSO₄) and the ethereal solution concentrated. The crude ester is redissolved in benzene (440 ml.), phosphorous pentoxide (88 g.) added and the resulting mixture is decanted, the residue washed with benzene, the benzene layers are combined, washed with water, saturated salt solution and dried (MgSO₄). Concentration of the dried organic phase yields ethyl 5-fluoro-2-methyl-3-indenyl-α-propionate as a residue, which is recrystallized from ethyl acetate-n-hexane.

(B) Cis- and trans - 5 - fluoro-2-methyl-1-(3'-chloro-4'-methylsulfinylphenylethylidene) - 3 - indenyl-(α-propionic) acids Ethyl 5-fluoro-2-methyl-3-indenyl-α-propionate (49.5 g., 0.2 mole) and 3-chloro-4-methylthiophenylacetaldehyde (0.2 mole) are condensed by the method of Example 1(C) and further treated by the methods of Examples 2 and 3 to yield the subject compounds.

| Starting material | Product |
|---|---|
| 5,6-difluoro-2-methyl-1-indanone. | Cis- and trans-5, 6 - difluoro - 2 - methyl 1-(3'-chloro-4'-methylsulfinylphenylethylidene)-3-indenyl-(α-propionic) acids. |
| 6-cyano-2-methyl-1-indanone. | Cis and trans - 5 - cyano - 2 - methyl - 1-(3' - chloro - 4' - methylsulfinylphenyldene)-3-indenyl-(α-propionic) acids. |
| 5-fluoro-6-methoxy-2-methyl-1-indanone. | Cis- and trans-5 - methoxy -6 -fluoro-2-methyl - 1 - (3' - chloro-4' - methyl sulfinylphenylethylidene)-3-indenyl-(α-propionic) acids. |
| 6-dimethylamino-2-methyl-1-indanone. | Cis - and trans - 5 - dimethylamino - 2 - methyl-1 - (3' - chloro-4' - methyl sulfinylphenylethylidene)-3-indenyl-(α-propionic) acids. |
| 6-allyloxy-2-methyl-1-indanone. | Cis- and trans-5-allyloxy-2-methyl-1-(3'-chloro-4' - methylsulfinylphenylethylidene)-3-indenyl-(α-propionic) acids. |
| 5-fluoro-2-methyl-1-indanone. | Cis- and trans - 6 - fluoro - 2 - methyl-1-(3' - chloro-4' - methylsulfinylphenylethylidene)-3-indenyl - (α-propionic) acids. |

EXAMPLE 5

3-chloro-methylthiocinnamaldehyde

To a mixture of 3-chloro-4-methylthiobenzaldehyde (0.707 mole), calcium oxide (12.0 g., 0.214 mole) and water (1.3 liter) at 50° is added with stirring freshly prepared acetaldehyde solution (35%, 360 g., 2.86 moles) over a period of three hours. The mixture is cooled, acidified with hydrochloric acid (6 N) and extracted with benzene (3× 1 l.). The combined benzene layers are washed with water, 5% sodium carbonate, water, salt solution and dried (Na$_2$SO$_4$). The benzene extract is con- concentrated in vacuo and distilled to yield 3-chloro-4-methylthiocinnamaldehyde.

(B) Cis- and trans - 5 - fluoro-2-methyl-1-(3'-chloro-4'-methyl-thiocinnamylidene)-3-indenyl-α-propionic acids 3-chloro-4-methylthiocinnamaldehyde (0.2 mole) and ethyl 5-fluoro-2-methyl-3-indenyl-α-propionate (33.25 g., 0.2 mole) are condensed by the method of Example 1(D) to yield the subject compounds.

(C) Cis - 5 - fluoro-2-methyl-1-(3'-hydroxy-4'-methylsulfinylcinnamylidene)-3-indenyl-α-propionic acid Cis - 5 - fluoro - 2 - methyl-1-(3'-chloro-4'-methylthiocinnamylidene)-3-indenyl-α-propionic acid (3.80 g., 0.01 mole) by the method of Example 1(E) is converted to the subject compound.

Using the same reaction conditions and techniques, the following compounds are obtained:

| Starting material | Product |
| --- | --- |
| Ethyl 5,6-difluoro-2-methyl-3-indenyl-α-propionate. | Cis-5,6-difluoro-2-methyl-1-(3'-chloro-4'-methylsulfinylcinnamylidene)-3-indenyl-(α-propionic) acid. |
| Ethyl 5-cyano-2-methyl-3-indenyl-α-propionate. | Cis-5-cyano-2-methyl-1-(3'-chloro-4'-methylsulfinylcinnamylidene)-3-indenyl-(α-propionic) acid. |
| Ethyl 5-dimethylamino-2-methyl-3-indenyl-α-propionate. | Cis-5-dimethylamino-2-methyl-1-(3'-chloro-4'-methylsulfinylcinnamylidene)-3-indenyl-(α-propionic) acid. |
| Ethyl 5-allyloxy-2-methyl-3-indenyl-α-propionate. | Cis-5-allyloxy-2-methyl-1-(3'-chloro-4'-methylsulfinylcinnamylidene)-3-indenyl-(α-propionic) acid. |
| Ethyl 5-methoxy-6-fluoro-2-methyl-3-indenyl-α-propionate. | Cis-5-methoxy-6-fluoro-2-methyl-1-(3'-chloro-4'-methylsulfinylcinnamylidene)-3-indenyl-(α-propionic) acid. |
| Ethyl 6-fluoro-2-methyl-3-indenyl-α-propionate. | Cis-6-fluoro-2-methyl-1-(3'-chloro-4'-methylsulfinylcinnamylidene)-3-indenyl-(α-propionic) acid. |

EXAMPLE 6

Cis- and trans - 5,α - difluoro - 2-methyl-1-(3'-chloro-4'-methylsulfinylcinnamylidene)-3-indenylacetic acids Ethyl 5,α-difluoro-2-methyl-3-indenylacetate (50.4 g., 0.2 mole) and 3-chloro-4-methylthiocinnamaldehyde (0.2 mole) by the method of Example 1(D) are condensed to form cis- and trans-5,α-difluoro-2-methyl-1-(3'-chloro-4'-methylthiocinnamylidene)-3-indenylacetic acids and these (0.769 g., 0.002 mole) individually to the subject compounds by the method of Example 1(E).

EXAMPLE 7

Cis- and trans - 5 - fluoro-2-methyl-1-(3'-chloro-4'-methylsulfinylcinnamylidene)-3-indenylacetic acids Methyl 5-fluoro-2-methyl-3-indenylacetate (44.05 g., 0.2 mole) and 3-chloro-4-methylthiocinnamaldehyde (0.2 mole) by the method of Example 1(B) are condensed to yield cis- and trans - 5 - fluoro-2-methyl-1-(3'-chloro-4'-methylthiocinnamylidene)-3-indenylacetic acids and these (0.722 g., 0.002 mole) individually by the method of Example 1(E) to the subject compound.

Using the same reaction conditions and techniques, the following compounds are obtained:

| Starting material | Product |
| --- | --- |
| Methyl 5,6-difluoro-2-methyl-3-indenylacetate. | Cis- and trans-5,6-difluoro-2-methyl-1-(3'-chloro-4'-methylsulfinylcinnamylidene)-3-indenylacetic acids. |
| Methyl 5-cyano-2-methyl-3-indenylacetate. | Cis- and trans-5-cyano-2-methyl-1-(3'-chloro-4'-methylsulfinylcinnamylidene)-3-indenylacetic acid. |
| Methyl 5-methoxy-6-fluoro-2-methyl-3-indenylacetate. | Cis- and trans-5-methoxy-6-fluoro-2-methyl-1-(3'-chloro-4'-methylsulfinylcinnamylidene)-3-indenylacetic acids. |
| Methyl 5-dimethylamino-2-methyl-3-indenylacetate. | Cis- and trans-5-dimethylamino-2-methyl-1-(3'-chloro-4'-methylsulfinylcinnamylidene)-3-indenylacetic acids. |
| Methyl 5-allyloxy-2-methyl-3-indenylacetate. | Cis- and trans-5-allyloxy-2-methyl-1-(3'-chloro-4'-methylsulfinylcinnamylidene)-3-indenylacetic acids. |
| Methyl 6-fluoro-2-methyl-3-indenylacetate. | Cis- and trans-6-difluoro-2-methyl-1-(3'-chloro-4'-methylsulfinylcinnamylidene)-3-indenylacetic acids. |

EXAMPLE 8

(A) (3-chloro-4-methyl)-phenylpropargaldehyde

A mixture of 3 - chloro-4-methylthiocinnamaldehyde (2.0 mole) and acetic acid (1.5 liter) is stirred vigorously while bromine (320 g., 2.0 mole) is added dropwise at 25°. Powdered anhydrous potassium carbonate is added at 25°. When the evolution of gas stops, the mixture is refluxed for 30 minutes, cooled and poured into cold water (2.5 liters). The mixture is cooled to 0–5° with stirring and stirred at this temperature overnight. The precipitate is separated by filtration without drying and crystallized from ethanol-water. 3 - chloro-4-methylthio-α-bromocinnamaldehyde is filtered, washed and dried in air.

The aldehyde (1.6 moles) methyl orthoformate (244 g., 2.3 moles), absolute ethanol (320 ml.) and ammonium chloride (4.0 g.) are refluxed for 30 minutes, low boiling components distilled at atmospheric pressure and distilled in vacuo to yield 1,1 - dimethoxy-3(3'-chloro-4'-methylthiophenyl)-2-propene. To this compound (1.35 mole) is added potassium hydroxide (132 g., 2.0 moles) in methanol (1400 ml.). The mixture is refluxed for 3 hours and poured into water (11.3 liters). The mixture is extracted with chloroform (3× 1.5 liter), the combined chloroform extracts washed with water (3× 660 ml.) and dried (Na$_2$SO$_4$). The chloroform is distilled and the residue fractionated in vacuo to obtain 1,1-dimethoxy-(3'-chloro-4'-methylthiophenyl) - 2 - propyne. This compound (1.0 mole) is added to water (1 liter) containing concentrated sulfuric acid (70 ml.), and the mixture is heated on the stream bath for 30 minutes with occasional mixing. The mixture is extracted with ether (3× 750 ml.), the ether extract washed with water and saturated salt solution, dried (Na$_2$SO$_4$), and concentrated to an oil at atmospheric pressure. The oil is distilled in vacuo to yield (3-chloro - 4 - methylthio) - phenylpropargaldehyde.

(B) Cis and trans-5-fluoro - 2 - methyl - 1 - (3'-chloro-4' - methylthiophenylpropargylidene) - 3 - indenyl-(α-propionic acids (3-chloro - 4 - methylthio) - phenylpropargaldehyde (0.2 mole) and ethyl 5-fluoro - 2 - methyl - 3-indenyl-α-propionate (33.25 g., 0.2 mole) are condensed by the method of Example 1(D) to yield the subject compounds.

(C) Cis- and trans - 5 - fluoro-2-methyl-1-(3'-chloro-4'-methylsulfinylphenylpropargylidene) - 3 - indenyl-(α-propionic acids Cis- and trans-5-fluoro-2-methyl - 1 - (3'-chloro - 4'-methylthiophenylpropargylidene) - 3 - indenyl - (α - propionic) acids (0.002 mole) individually are converted to the subject compounds by the method of Example 1(E).

Using the same reaction conditions and techniques, the following compounds are obtained:

| Starting material | Product |
| --- | --- |
| Ethyl 5,6-difluoro-2-methyl-3-indenyl-α-propionate. | Cis and trans-5,6-difluoro-2-methyl-1-(3'-chloro-4'-methylsulfinyl-phenylpropargylidene)-3-indenyl-(α-propionic) acids. |
| Ethyl 5-methoxy-6-fluoro-2-methyl-3-indenyl-α-propionate. | Cis and trans-5-methoxy-6-fluoro-2-methyl-1-(3'-chloro-4'-methylsulfinylphenylpropargylidene)-3-indenyl-(α-oprpionic) acids. |
| Ethyl 5-dimethylamino-2-methyl-3-indenyl-α-propionate. | Cis and trans-5-dimethylamino-2-methyl-1-(3'-chloro-4'-methylsulfinylphenylpropargylidene)-3-indenyl-(α-propionic) acids. |
| Ethyl 5-allyloxy-2-methyl-3-indenyl-α-propionate. | Cis and trans-5-allyloxy-2-methyl-1-(3'-chloro-4'-methylsulfinyl-phenylpropargylidene)-3-indenyl-(-α propionic) acids. |
| Ethyl 5-cyano-2-methyl-3-indenyl-α-propionate. | Cis and trans-5-cyano-2-methyl-1-(3'-chloro-4'-methylsulfinylphenyl-propargylidene)-3-indenyl-(α-propionic) acids. |
| Ethyl 6-fluoro-2-methyl-3-indenyl-α-propionate. | Cis and trans-6-fluoro-2-methyl-1-(3'-chloro-4'-methylsulfinylphenyl-propargylidene)-3-indenyl-(α-propionic) acids. |

EXAMPLE 9

Cis- and trans-5,α-difluoro-2-methyl - 1 - (3'-chloro-4'-methylsulfinylphenylpropargylidene) - 3 - indenylacetic acids Ethyl 5,α-difluoro - 2 - methyl-3-indenylacetate (50.4 g., 0.2 mole) and (3' - chloro-4-methylthio)-phenylpropargaldehyde (0.2 mole) are condensed by the method of Example 1(D) and the products are individually converted by the method of Example 1(E) to the subject compound.

EXAMPLE 10

Cis- and trans-5-fluoro-2-methyl-1-(3'-chloro-4'-methylsulfinylphenylpropargylidene)-3-indenylacetic acids Methyl 5-fluoro-2-methyl-3-indenylacetate (44.05 g., 0.2 mole) and (3-chloro-4-methylthio)-phenylpropargylaldehyde (0.2 mole) are condensed by the method of Example 1(D) to yield cis- and trans-5-fluoro-2-methyl-1-(3' - chloro - 4' - methylthiophenylpropargylidene)-3-indenylacetic acids and these individually are converted to the subject compounds by the method of Example 1(E).

EXAMPLE 11

(A) t-Butyl 5-fluoro-2-methyl-3-indenyl-α-propionate

Ethyl 5-fluoro-2-methyl-3-indenyl-α-propionate (246.3 g., 1.0 mole) from Example 4(A), t-butyl acetate (700 g., 6.0 moles) and sodium methoxide (108 g., 2 moles) under nitrogen are stirred and refluxed at 10:1 ratio through a 1.5' column packed with glass 1/8" helices. The mixture is distilled for 18 hours and 250 ml. of distillate is collected. The excess of t-butylacetate is distilled in vacuo and the residue is taken up in methylene chloride, filtered through diatomaceous earth, then through acid-washed alumina. The methylene chloride is removed and the residue crystallized from acetone-n-hexane to yield t-butyl 5-fluoro-2-methyl-3-indenyl-α-propionate.

(B) t-Butyl 5-fluoro-1-hydroxymethylene-2-methyl-3-indenyl-α-propionate, sodium salt To a mixture of t-butyl 5-fluoro-2-methyl-3-indenyl-α-propionate (55.3 g., 0.2 mole) in benzene (500 ml.) and ethyl formate (74.1 g., 1.0 mole) is added oil-free sodium hydride (7.2 g., 0.3 mole). The mixture is stirred at room temperature 1 hour each day for 2 days. Any remaining sodium hydried is decomposed by the addition of methanol (20 ml.) in ether (100 ml.). The salt is filtered, washed with ether and dried in vacuo.

(C) Cis- and trans-5-fluoro-2-methyl-1-(4'-methylthio-phenoxymethylene)-3-indenyl-(α-propionic) acids The sodium salt (32.6 g., 0.01 mole) from Example 11(B) in dimethoxyethane (200 ml.) is heated at reflux with stirring for 15 hours with p-methylthiophenyl iodide (25.0 g., 0.01 mole). The mixture is concentrated in vacuo to remove solvent, taken up in methylene chloride-water, the layers separated and the water layer extracted with methylene chloride (2× 100 ml.). The combined methylene chloride layers are concentrated to 1/3 volume and chromatographed over silica gel and eluted by methanolic chloroform to separate cis- and trans-isomers. The isomers are identifiable by integrating the 2-methyl signal in the N.M.R. spectrum. The esters (4.27 g., 0.002 mole) are individually heated in dilute sulfuric acid (5%, 40 ml.) with stirring for 1 hour at 95–100°. The mixture is cooled, filtered, washed and dried to yield the subject compounds.

(D) Cis-5-fluoro-2-methyl-1-(4'-methylsulfinylphenoxymethylidene)-3-indenyl-(α-propionic) acid Cis-5-fluoro - 2 - methyl-1-(4'-methylthiophenoxymethylidene)-3-indenyl-(α-propionic) acid (0.370 g., 0.001 mole) by the method of Example 1(C) is converted to the subject compound.

Alternatively, the sodium salt (3.26 g., 0.01 mole) from Example 11(B) is reacted with p-methylsulfinylphenyliodide (26.6 g., 0.01 mole) by the method of Example 11(C) to yield the subject compound, which is recrystallized from methanol-n-hexane to yield the subject compound.

Using the same reaction conditions and techniques, the following compounds are obtained:

| Starting material | Product |
| --- | --- |
| t-Butyl 5,6-difluoro-2-methyl-3-indenyl-α-propionate. | Cis-5,6-difluoro-2-methyl-1-(4'-methylsulfinylphenoxymethylidene)-3-indenyl-(α-propionic) acid. |
| t-Butyl 5-cyano-2-methyl-3-indenyl-α-propionate. | Cis-5-cyano-2-methyl-1-(4'-methylsulfinylphenoxymethylidene-3-indenyl-(α-propionic) acid. |
| t-Butyl 5-dimethylamino-2-methyl-3-indenyl-α-propionate. | Cis-5-dimethylamino-2-methyl-1-(4'-methylsulfinylphenoxymethylidene 3-indenyl-(α-propionic) acid. |
| t-Butyl 5-allyloxy-2-methyl-3-indenyl-α-propionate. | Cis-5-methoxy-6-fluoro-2-methyl-1-(4'-methylsulfinylphenoxymethylidene)-3-indenyl-(α-propionic) acid. |
| t-Butyl 6-fluoro-2-methyl-3-indenyl-α-propionate. | Cis-6-fluoro-2-methyl-1-(4'-methyl-sulfinylphenoxymethylidene)-3-indenyl-(α-propionic) acid. |

EXAMPLE 12

Trans-5-fluoro-2-methyl-1-(4'-methylsulfinylphenoxymethylidene)-3-indenyl-(α-propionic) acid The trans compound (0.386 g., 0.001 mole) obtained by the procedure of the second paragraph of Example 11(D), is recrystallized from methanol-n-hexane to yield the subject compound.

EXAMPLE 13

(A) Ethyl 5,α-difluoro-2-methyl-3-indenylacetate

A mixture of 6-fluoro-2-methyl-1-indanone (24.6 g., 0.15 mole), "activated" zinc dust (12.7 g., 0.20 mole), ethyl bromofluoroacetate (27.8 g., 0.15 mole), and a crystal of iodine in dry benzene (750 ml.) is refluxed for 5 hours. The mixture is poured into 5% sulfuric acid (750 ml.), extracted with ether, the ether extract dried ($MgSO_4$) and the ethereal solution concentrated. The crude ester is redissolved in benzene (220 ml.) and phosphorus pentoxide (44 g.) added, and the resulting mixture is refluxed for 30 minutes. The mixture is decanted, the residue washed with benzene, the benzene layers are combined, washed with water, saturated salt solution and dried ($MgSO_4$). Concentration of the dried organic phase yields ethyl 5,α-difluoro-2-methyl-3-indenyl-acetate as a residue.

(B) t-Butyl 5,α-difluoro-2-methyl-3-indenylacetate

Ethyl 5,α-difluoro-2-methyl-3-indenylacetate (252.3 g., 1.0 mole) by the method of Example 11(A) is converted to the subject compound.

(C) t-Butyl 5,α-difluoro-1-hydroxymethylene-2-methyl-3-indenylacetate, sodium salt t-Butyl 5,α-difluoro-2-methyl-3-indenylacetate (56.1 g., 0.2 mole) by the method of Example 11(B) is converted to the subject compound.

(D) *Cis*- and *trans*-5,α-difluoro-2-methyl-1-(4'-methylthiophenoxymethylidene)-3-indenylacetic acids The sodium salt (33.0 g., 0.01 mole) from Example 13(C) by the method of Example 11(C) is converted to the subject compounds.

(E) *Cis*-5,α-difluoro-2-methyl-1-(4'-methylsulfinylphenoxymethylidene)-3-indenylacetic acid (A) *Cis*-5,α-difluoro-2-methyl-1-(4'-methylthiophenoxymethylidene)-3-indenylacetic acid (0.374 g., 0.001 mole) by the method of the first paragraph of Example 11(D) is converted to the subject compound.

(B) Alternatively, the sodium salt (33.0 g., 0.01 mole) from Example 13(C) by the method of the second paragraph of Example 11(D) is converted to the subject compound.

Using the same reaction conditions and techniques, the following compounds are obtained:

| Starting material | Product |
| --- | --- |
| Methyl 5,6-α-trifluoro-2-methyl-3-indenylacetate. | *Cis*-5,6-α-trifluoro-2-methyl-1-(4'-methylsulfinylphenoxymethylidene)-3-indenylacetic acid. |
| Methyl 5-methoxy-6-α-difluoro-2-methyl-3-indenylacetate. | *Cis*-5-methoxy-6-α-difluoro-2-methyl-1-(4'-methylsulfinylphenoxymethylidene)-3-indenylacetic acid. |
| Methyl 5-cyano-α-fluoro-2-methyl-3-indenylacetate. | *Cis*-5-cyano-α-fluoro-2-methyl-1-(4'-methylsulfinylphenoxymethylidene)-3-indenylacetic acid. |
| Methyl 5-allyloxy-α-fluoro-2-methyl-3-indenylacetate. | *Cis*-5-allyloxy-α-fluoro-2-methyl-1-(4'-methylsulfinylphenoxymethylidene)-3-indenylacetic acid. |
| Methyl 5 dimethylamino-α-fluoro-2-methyl-3-indenylacetate. | *Cis*-5-allyloxy-α-fluoro-2-methyll-1-(4'-methylsulfinylphenoxymethyidene)-3-indenylacetic acid. |
| Methyl 6-α-difluoro-2-methyl-3-indenylacetate. | *Cis*-6-α-difluoro-2-methyl-1-(4'-methylsulfinylphenoxymethylidene)-3-indenylacetic acid. |

EXAMPLE 14

(A) t-Butyl 5-fluoro-2-methyl-3-indenylacetate

Methyl 5-fluoro-2-methyl-3-indenylacetate (220.3 g., 1.0 mole) by the method of Example 11(A) is converted to the subject compound.

(B) t-Butyl 5-fluoro-1-hydroxymethylene-2-methyl-3-indenylacetate, sodium salt t-Butyl 5-fluoro-2-methyl-3-indenylacetate (52.5 g., 0.2 mole) by the method of Example 11(B) is converted to ths subject compound.

(C) *Cis*- and *trans*-5-fluoro-2-methyl-1-(4'-methylthiophenoxymethylidene)-3-indenylacetic acids The sodium salt (31.2 g., 0.01 mole) from Example 14(B) by the method of Example 11(C) is converted to the subject compounds.

(D) *Cis*-5-fluoro-2-methyl-1(4'-methylsulfinylphenoxymethylidene)-3-indenylacetic acid

*Cis*-5-fluoro-2-methyl-1-(4' - methylthiophenoxyethylidene)-3-indenylacetic acid (0.356 g., 0.001 mole) by the method of the first paragraph of Example 11(D) is converted to the subject compound.

The sodium salt (31.2 g., 0.01 mole) from Example 14(B) by the method of the second paragraph of Example 11(D) is converted to the subjected compound.

Using the same reaction conditions and techniques, the following products are prepared.

| Starting material | Product |
| --- | --- |
| Methyl 5,6-difluoro-2-methyl-3-indenylacetate. | *Cis*-5,6-difluoro-2-methyl-1-(4'-methylsulfinylphenoxymethylidene-3-indenylacetic acid. |
| Methyl 5-methoxy-6-fluoro-2-methyl-3-indenylacetate. | *Cis*-5-methoxy-6-fluoro-2-methyl-1-(4'-methylsulfinylphenoxymethylidene)-3-indenylacetic acid. |
| Methyl 5-cyano-2-methyl-3-indenylacetate. | *Cis*-5-cyano-2-methyl-1-(4'-methylsulfinylphenoxymethylidene)-3-indenylacetic acid. |
| Methyl 5-allyloxy-2-methyl-3-indenylacetate. | *Cis*-5-allyloxy-2-methyl-1-(4'-methylsulfinylphenoxymethylidene)-3-indenylacetic acid. |
| Methyl 5-dimethylamino-2-methyl-3-indenylacetate. | *Cis*-5-dimethylamino-2-methyl-1-(4'-methylsulfinylphenoxymethylidene)-3-indenylacetic acid. |
| Methyl 6-fluoro-2-methyl-3-indenylacetate. | *Cis*-6-fluoro-2-methyl-1-(4'-methylsulfinylphenoxymethylidene)-3-indenylacetic acid. |

EXAMPLE 15

(A) o-(β-Hydroxyethoxy)-thioanisole o-Hydroxythioanisole (14.1 g., 0.1 mole) is dissolved in sodium ethoxide (6.8 g., 0.1 mole) in absolute ethanol (100 ml.) and stirred as β-hydroxyethylchloride (8.1 g., 0.1 mole) is added. The reaction mixture is refluxed for 2 hours and cooled. The o-(β-hydroxyethoxy)-thioanisole is extracted.

Using the same reaction conditions and techniques, when o-hydroxythioanisole is reacted with β-hydroxymethyl chloride, β-hydroxypropyl chloride or β-hydroxybutyl chloride, there is obtained o-(β-hydroxymethoxy)-thioanisole, o-(β-hydroxypropoxy)-thioanisole and o-(β-hydroxybutoxy)-thioanisole, respectively.

(B) *Cis*-5,a-difluoro-2-methyl-1-(3'β-hydroxyethoxy-4'-methylsulfinylphenylethylidene)-3-indenylacetic acid The product of Example 15(A) is reacted by the methods of Example 1(A) through 1(E) to obtain *cis*-5,α-difluoro-2-methyl-1(3'β-hydroxyethoxy-4' - methylsulfinylphenylethylidene)-3-indenylacetic acid.

In this manner the other thionaisoles of Example 15(A) may be reacted to form the corresponding indenyl acetic acids.

EXAMPLE 16

(A) o-Ethoxythioanisole o-Chlorothioanisole (15.85 g., 0.1 mole) is stirred at reflux in nitrobenzene containing copper powder (100 mg.) and sodium ethoxide (6.8 g., 0.1 mole) for 2 hours. The product is steam distilled and the distillate dried and fractionally distilled under reduced pressure to yield o-ethoxythioanisole.

Using the same reaction conditions and techniques, when o-chlorothioanisole is reacted with sodium propoxide and sodium t-butoxide, there is obtained o-methoxythioanisole, o-propoxythioanisole and o-t-butoxythioanisole, respectively.

(B) *Cis*-5,α-difluoro-2-methyl-1-(3'-ethoxy-4'-methylsulfinylphenylethylidene)-3-indenylacetic acid The product of Example 16A is reacted by the methods of Examples 1(A) through 1(E) to obtain *cis*-5,α-difluoro-2-methyl-1-(3'-ethoxy - 4' - methylsulfinylphenylethylidene)-3-indenylacetic acid.

In this manner the other thioanisoles of Example 11(A) may be reacted to form the corresponding indenylacetic acid.

EXAMPLE 17

Methyl *cis*-5-fluoro-2-methyl-1-(4'-methylsulfinyl phenoxymethylidene-3-indenylacetate

*Cis* - 5 - fluoro - 2 - methyl - 1 - (4' - methylsulfinylphenoxyethylidene)-3-indenylacetic acid (0.03 mole) is dissolved in methanol (50 ml.), concentrated sulfuric acid (1.0 ml.) is added and the mixture heated at reflux for 3 hours. The mixture is cooled, poured into ethyl acetate and extracted successively with saturated sodium bicarbonate, water and saturated salt solution. The ethyl acetate extract is dried (MgSO₄), concentrated to dryness and the residue crystallized from ethyl acetate-n-hexane.

EXAMPLE 18

Cis-5-fluoro-2-methyl-1-(4'-methylsulfinyl-phenoxymethylidene) indenylacetamide

Cis-5-fluoro-2-methyl - 1 - (4'-methylsulfinylphenoxy-methylidene-3-indenylacetic acid (0.01 mole) is warmed with thionyl chloride (5 ml.) for 25 minutes. The mixture is cooled to 25° and poured with stirring into ice-cold concentrated ammonia solution. The precipitated amide is washed with water, dried and recrystallized from methanol-water to yield cis-5-fluoro-3-methyl-1-(4'-methylsulfinylphenoxyethylidene)-3-indenylacetamide.

Similarly, when ammonia is replaced by an equivalent amount of the following amines, the corresponding amines are obtained.

Morpholine
Dimethylamine
Ethanolamine
Benzylamine
N,N-diethylethylenediamine
Benzylglycinate
Piperidine
Pyrrolidine
N-methylpiperazine
N-phenylpiperazine
N-hydroxyethylpiperazine
Piperazine
Diethylamine
Diethanolamine
Aniline
p-Ethoxyaniline
p-Chloroaniline
p-Fluoroaniline
p-Trifluoromethylaniline
Butylamine
Cyclohexylamine
Methylamine
D-glucosamine
Tetra-o-acetyl-d-glucosamine
D-galactosylamine
D-mannosylamine
N,N-dimethylglycine amide
N,N-dibutylglycine amide
N-methyl-2-aminomethylpiperidine
N-methyl-2-aminomethylpyrrolidine
β-Ethoxyethylamine
Di(β-ethoxyethyl)amine
β-Phenethylamine
α-Phenethylamine
Dibenzylamine
D-mannosamine

EXAMPLE 19 t-Butyl cis-5-allyloxy-2-methyl-1-(3'-chloro-4'-methylsulfinylphenylethylidene)-3-indenylacetate Cis-5-allyloxy-2-methyl-1-(3'-chloro - 4' - methylsulfinylphenylethylidene)-3-indenylacetic acid (0.01 mole) is added to isobutylene (30 ml.) and concentrated sulfuric acid (0.1 ml.). The mixture is stoppered securely and shaken at 25° for 18 hours, chilled to 0° and the whole poured into a separatory funnel containing ether (50 ml.), water (25 ml.), ice (25 ml.) and sodium hydroxide (1.0 g.). The layers are separated, the water layer extracted with ether (2× 40 ml.), the ethereal extracts washed with water and saturated salt solution and dried (MgSO₄). The ethereal extract is concentrated to dryness and the residue crystallized from ethyl acetate-n-hexane to yield the subject compound.

EXAMPLE 20

Ammonium cis - 5 - allyloxy - 2 - methyl - 1 - (3' - β-hydroxy-ethoxy - 4' - methylsulfinylphenoxymethylidene)-3-indenylacetate To cis - 5 - allyloxy - 2 - methyl - 1 - (3' - β-hydroxyethoxy - 4' - methylsulfinylphenoxyethylidene) - 3 - indenylacetic acid (0.001 mole) in methanol (10 ml.) is added methanolic ammonia (1 N, 1 ml.). The mixture is evaporated to dryness to yield the subject compound.

EXAMPLE 21

Aluminum cis-5-fluoro-2-methyl-1-(3'-ethoxy-4'-methylsulfinylphenylethylidene)-3-indenylacetate To a solution of aluminum tert.-butoxide (0.246 g., 0.001 mole) in ether (50 ml.) is added cis-5-fluoro-2-methyl - 1 - (3' - ethoxy - 4' - methylsulfinylphenylethylidene-3-indenylacetic acid (0.003 mole) in pyridine (50 ml.) with stirring at 10°. The mixture is concentrated to dryness in vacuo to yield the subject compound.

EXAMPLE 22

Sodium cis - 5 - chloro - 2 - methyl - 1 - (4' - methylsulfinylphenoxymethylidene-3-indenylacetate To cis - 5 - chloro - 2 - methyl - 1 - (4' - methylsulfinylphenoxyethylidene)-3-indenylacetic acid (0.001 mole) in methanol is added methanolic sodium methoxide (0.1 N, 10 ml.). The mixture is concentrated to dryness in vacuo to yield the subject compound.

EXAMPLE 23

Methoxymethyl cis - 5 - allyloxy - 2 - methyl - 1 - (3'-hydroxy - 4' - methylsulfinylphenylethylidene) - 3 - indenylacetate Chloromethyl methyl ether (0.055 mole) is added to a suspension of cis - 5 - allyloxy - 2 - methyl - 1 - (3'-hydroxy - 4' - methylsulfinylphenylethylidene) - 3 - indenylacetic acid (0.05 mole) and anhydrous potassium carbonate (0.15 mole) in 250 ml. of anhydrous acetone. The mixture is allowed to stir overnight at room temperature. Diethyl ether is added (about 200 ml.) and the mixture is filtered. The filtrate is washed once with 100 ml. of water and dried over anhydrous sodium sulfate. It is then filtered and the solvent is removed in vacuo. The residue is chromatographed on 200 g. of acid-washed alumina, using ether-petroleum ether (varying from 10 to 60% ether by volume) as the eluent, to give methoxymethyl cis - 5 - allyloxy - 2 - methyl - 1 - (3' - hydroxy-4'-methylsulfinylphenylethylidene)-3-indenylacetate.

What is claimed is:
1. A compound of the formula

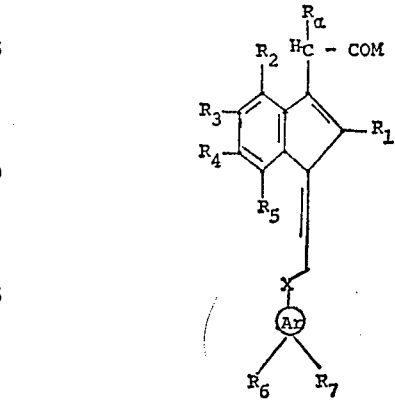

wherein
Ar is phenyl;
X is propargyl or —O—;
$R_a$ is hydrogen or methyl
$R_1$ is loweralkyl;

$R_2$ is hydrogen;
$R_3$ is hydrogen, halogen, loweralkoxy or allyloxy;
$R_4$ is hydrogen or halogen;
$R_5$ is hydrogen;
$R_6$ is loweralkylsulfinyl;
$R_7$ is hydrogen or halogen; and
M is hydroxy, loweralkoxy or OMe wherein Me is a cation of a pharmaceutically acceptable salt.

2. Cis - 5 - fluoro - 2 - methyl - 1 - (4' - methylsulfinyl-phenoxymethylidene)-3-indenyl-($\alpha$-propionic) acid.

3. Cis - 5 - fluoro - 2 - methyl - 1 - (4' - methylsulfinyl-phenoxymethylidene)-3-indenylacetic acid.

4. Cis- or trans - 5 - fluoro-2-methyl-1-(3'-chloro-4-'methylsulfinylphenylpropargylidene)-3-indenylacetic acid.

5. Cis- or trans - 5 - fluoro - 2 - methyl - 1 - (3' - chloro-4' - methylsulfinylphenylpropargylidene) - 3 - indenyl-($\alpha$-propionic) acids.

References Cited

UNITED STATES PATENTS

| | | | |
|---|---|---|---|
| 3,609,184 | 9/1971 | Miyai | 280—473 F X |
| 3,647,858 | 3/1972 | Hinkley | 280—473 F X |
| 3,654,349 | 4/1972 | Shen et al. | 280—473 F X |
| 3,312,730 | 4/1967 | Winters et al. | 280—470 X |
| 3,622,623 | 11/1971 | Shen et al. | 280—470 |

FOREIGN PATENTS

| | | | |
|---|---|---|---|
| 1,178,658 | 1/1970 | England | 280—520 |

OTHER REFERENCES

Roberts et al.: "Bosie Principles of Organic Chemistry," W. A. Benjamin Inc., New York, N.Y. (1965), p. 758.

LORRAINE A. WEINBERGER, Primary Examiner

J. F. TERAPANE, Assistant Examiner

U.S. Cl. X.R.

424—246, 248, 251, 263, 267, 274, 275, 285, 287, 295, 304, 308, 309, 316, 319, 324; 260—243 R, 247.1, 251 R, 256.5, 268 C, 293.62, 294.8 B, 302, 309, 326.3, 332.2 A, 347.2, 348 A, 439 R, 448 R, 465 D, 469, 470, 471 R, 473 F, 515 M, 516, 518 R, 518 A, 519, 520, 534 M, 558 S, 559 T, 577, 590, 599, 609 R